US007971612B2

(12) United States Patent
Lapointe

(10) Patent No.: US 7,971,612 B2
(45) Date of Patent: Jul. 5, 2011

(54) FLOOR PLANKS PRODUCTION MACHINES AND METHOD

(75) Inventor: Andre Lapointe, St-Simon-les-Mines (CA)

(73) Assignee: OSI Machinerie Inc., Saint-Georges (CA)

( * ) Notice: Subject to any disclaimer, the term of this patent is extended or adjusted under 35 U.S.C. 154(b) by 14 days.

(21) Appl. No.: 12/166,758

(22) Filed: Jul. 2, 2008

(65) Prior Publication Data

US 2009/0007988 A1 Jan. 8, 2009

Related U.S. Application Data

(60) Provisional application No. 60/948,001, filed on Jul. 5, 2007.

(51) Int. Cl.
*B23Q 15/00* (2006.01)
*B27L 11/00* (2006.01)
*B27C 1/00* (2006.01)

(52) U.S. Cl. ...................... 144/357; 144/375; 144/117.1

(58) Field of Classification Search .................. 144/3.1, 144/91, 354, 357, 375, 117.1, 369, 114, 134, 144/245.1, 368; 83/364, 13, 75.5, 76.8, 80
See application file for complete search history.

(56) References Cited

U.S. PATENT DOCUMENTS 1,801,244 A * 4/1931 Blood .......................... 144/90.1
2,577,630 A * 12/1951 Redin ............................ 144/3.1
2,581,947 A * 1/1952 Fair ................................ 144/91
2,974,692 A * 3/1961 Bolenbach ...................... 83/473
3,738,404 A * 6/1973 Walker .......................... 144/340
4,082,129 A * 4/1978 Morelock ...................... 144/368
4,457,350 A * 7/1984 Finnila .......................... 144/400
4,643,237 A * 2/1987 Rosa ............................. 144/369
5,396,938 A * 3/1995 Cannaday ..................... 144/357
5,443,103 A * 8/1995 Kopacz et al. ................. 144/3.1
5,597,024 A * 1/1997 Bolyard et al. ............... 144/369
5,679,191 A * 10/1997 Robinson ........................ 156/64
5,960,104 A * 9/1999 Conners et al. ............... 382/141
6,164,349 A * 12/2000 Hsieh ............................. 144/3.1
6,247,511 B1 * 6/2001 Maeda et al. ................. 144/375
6,571,839 B2 * 6/2003 Allison et al. ................ 144/357
6,594,590 B2 7/2003 Woods et al.
6,666,246 B2 * 12/2003 Gilbert .......................... 144/382
6,695,944 B2 * 2/2004 Courtney ...................... 156/252
6,878,228 B2 * 4/2005 Courtney ...................... 156/257
7,070,370 B2 * 7/2006 Brooks .......................... 409/138
7,171,278 B2 * 1/2007 Baker et al. ...................... 700/28
7,227,165 B2 * 6/2007 Hubert et al. ............ 250/559.25

(Continued)

OTHER PUBLICATIONS

FDM Solid Wood Technology, Scanner cuts labor at flooring mill, Jul. 2005, FDM, 36-40.*
Scanner, FDM, Jul. 2005, pp. 36-40.

*Primary Examiner* — David J. Walczak
*Assistant Examiner* — Jennifer Chiang
(74) *Attorney, Agent, or Firm* — Pearne & Gordon LLP

(57) ABSTRACT

A floor planks production method, for producing wood flooring from raw lumbers, by surfacing top and lower faces of the lumbers to a final thickness of the lumbers; optimizing the lumbers along a length thereof to determine lengths of best faces; and profiling edges of the optimized lumbers. The system comprises a surfacing unit processing both top and lower faces of each lumber to final dimensions; an optimizing unit receiving lumbers from the surfacing unit; and a profiling unit processing edges of each length of best faces positioned by the optimizing unit.

13 Claims, 4 Drawing Sheets

U.S. PATENT DOCUMENTS

| | | | | |
|---|---|---|---|---|
| 7,347,912 | B2 * | 3/2008 | Engel et al. | 156/153 |
| 7,490,641 | B2 * | 2/2009 | McGehee et al. | 144/117.1 |
| 7,644,557 | B2 * | 1/2010 | Moriau et al. | 52/745.19 |
| 2003/0192412 | A1 * | 10/2003 | Otto et al. | 83/13 |
| 2004/0177896 | A1 * | 9/2004 | McGehee et al. | 144/114.1 |
| 2004/0250913 | A1 | 12/2004 | Baker et al. | |
| 2005/0150743 | A1 * | 7/2005 | Henderson | 198/403 |
| 2006/0278306 | A1 * | 12/2006 | Williams et al. | 144/354 |

* cited by examiner

FLOOR PLANKS PRODUCTION MACHINES AND METHOD

CROSS REFERENCE TO RELATED APPLICATIONS

This application claims priority on U.S. provisional application Ser. No. 60/948,001, filed on Jul. 5, 2007. All documents above are incorporated herein in their entirety by reference.

FIELD OF THE INVENTION

The present invention relates to production of flooring planks from lumbers. More specifically, the present invention is concerned with a system and a method for production of flooring planks.

BACKGROUND OF THE INVENTION

In the industry of timber flooring, surface planers are commonly used for surfacing each piece of raw wood, or lumbers. The lumbers are generally fed one by one in the surface planer for processing on four sides thereof. Fixed rollers are generally provided as a feed system forcing the lumbers therethrough, one after the other. Mobile heads provided with abrasion means such as knives, inside the surface planer, have different machining actions on the lumbers.

Generally, before the lumbers are fed to the surface planer, a number of operations are performed by one or several operators positioned at the input of the surface planer. For each lumber, the operators cut out major physical defects that might jam the surface planer for example. Then, for each lumber, the operators select a face thereof, which is susceptible to yield a best finish for the working surface of the floor. However, since at this stage the wood is still not at its final thickness, coloration and shades defects may not be visible and therefore a face may be wrongly selected as the potentially best one for the working face.

As illustrated in FIG. 1 of the appended drawings, the working face 12 thus selected is then surfaced, whereas the opposite face 14 is surfaced and provided with grooves 16 in a lengthwise direction to provide aeration canals once the floor is laid out. Both edges of the lumber 10 are machined, to yield a mortise 18 on a first edge and a tenon 20 on the opposite edge, along the length of the lumber. A chamfrain 22 may further be machined on each side of the working face 12.

Usually, these four machining steps, including surfacing of each face, machining the edges and providing grooves, are performed in a single machine. Therefore, the lumbers that are fed therein must be of a tightly controlled constant width and thickness to yield good results. Moreover, it is important that the lumbers be not overly wrapped along their width, in order to prevent jamming inside the machine.

Such kind of machines requires a number of adjustments to control the machining dimensions and the quality of the finished surfaces. As dimensional tolerances are very tight in the fabrication of floor, adjusting the machine is very complex and involves highly qualified operators.

As surfaced lumbers exit the machine, they are cut out and graded into planks according to color variations and physical defects. This is achieved either by operators, or by numerical vision systems or a system combining operators and numerical vision. As a result, a varying amount of material is discarded and planks downgraded, depending, as mentioned hereinbefore, on the step of working face selection.

A number of surface planers are currently available for a range of applications, including machining of hard and soft woods, of a variety of wood pieces and of planks intended for timber flooring.

Sturdy and reliable surface planers dedicated to machining of planks intended for timber flooring are currently available. Some are provided with simplified adjustment systems and steady steel frames for example. Others are less sturdy but allow knife positioning adapted to the production of planks for flooring, and high production speed.

However, these machines and their adjustment requirements are still a limit to the versatility and flexibility of the production lines.

Therefore, there is a need for a machine and a method that would overcome the above drawbacks of the prior art.

SUMMARY OF THE INVENTION

More specifically, there is provided a method for producing wood flooring from raw lumbers, comprising, for each raw lumber, surfacing top and lower faces of the lumber to a final thickness of the lumber; optimizing the lumber along a length thereof to determine lengths of best faces; and profiling edges of the optimized lumber.

There is further provided a system for producing wood flooring from raw lumbers, comprising a surfacing unit processing both top and lower faces of each lumber to final dimension; an optimizing unit receiving lumbers from the surfacing unit; and a profiling unit processing edges of each length of best faces positioned by the optimizing unit.

Other objects, advantages and features of the present invention will become more apparent upon reading of the following non-restrictive description of embodiments thereof, given by way of example only with reference to the accompanying drawings.

DESCRIPTION OF ILLUSTRATIVE EMBODIMENTS

The present invention is illustrated in further details by the following non-limiting examples.

Figure 1:
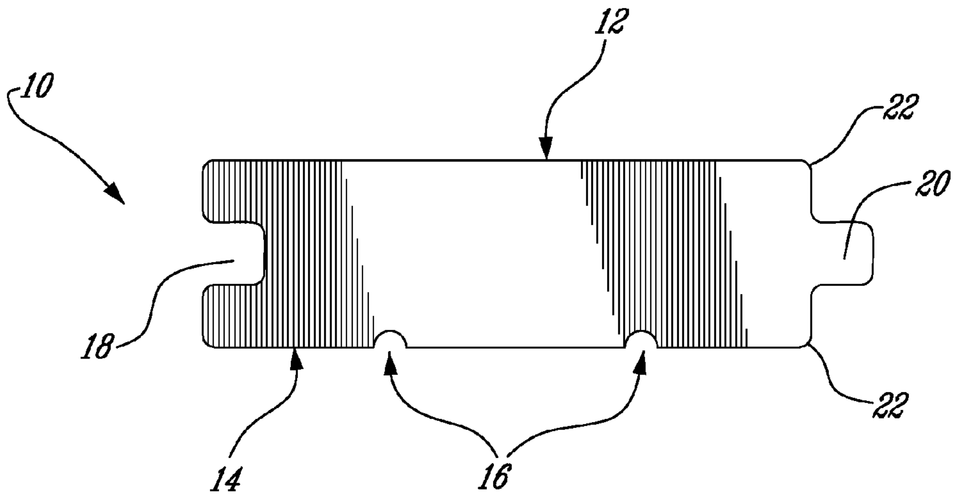
Fig. 1 (PRIOR ART)
FIG. 1 is a schematical view of a plank machined for flooring according to the prior art.
Figure 2:
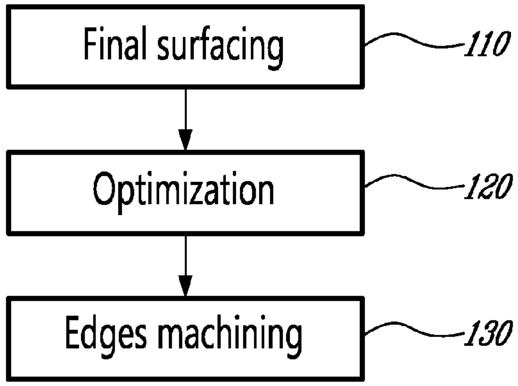
FIG. 2 is a flowchart of a method according to an embodiment of a first aspect of the present invention.
Figure 3:
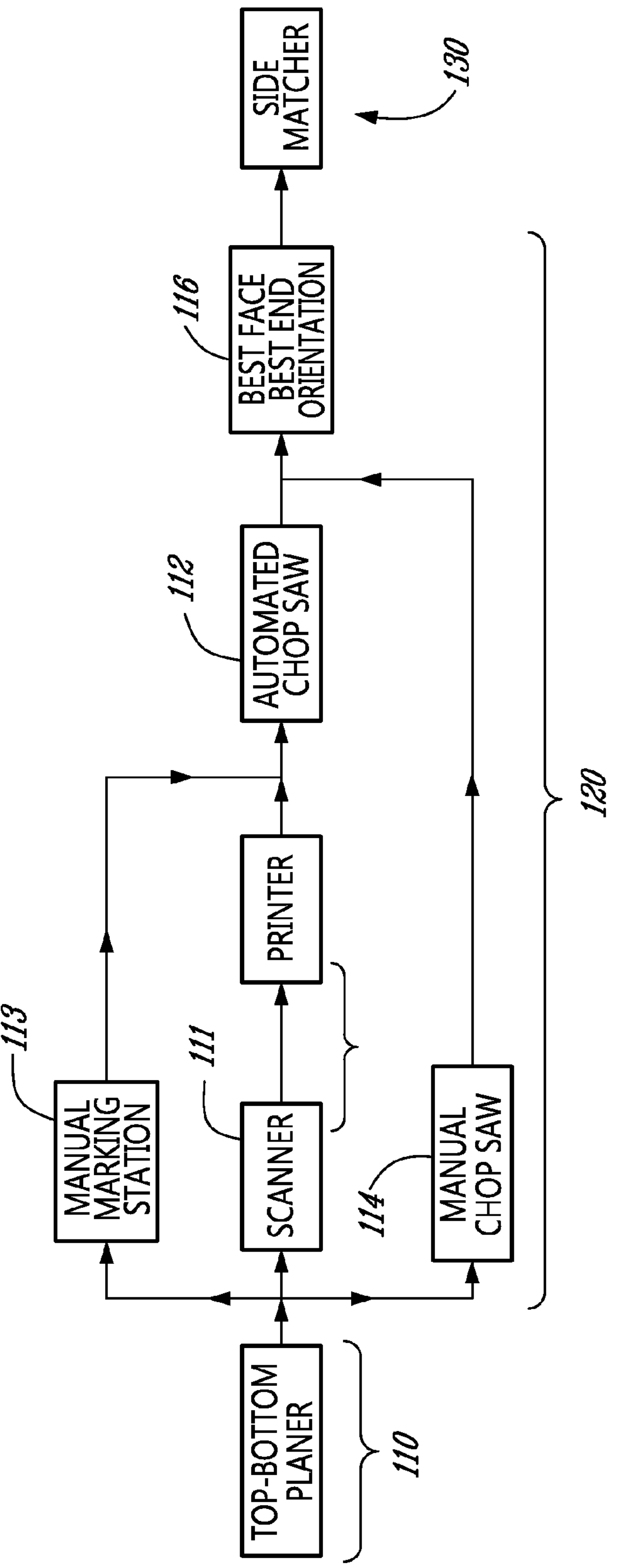
FIG. 3 is a detailed flowchart of a method according to an embodiment of the first aspect of the present invention.

According to an embodiment of a first aspect of the present invention, a method is provided, as shown in the flowchart of FIGS. 2 and 3.

The method generally comprises, for each raw lumber, surfacing both faces to final dimension in a surfacing unit (Step 110); selecting the best face along the length of the surfaced lumber (Step 120); and edges machining in a profiling unit (Step 130).

In step 110, raw lumbers are fed between presser rolls of a self-centering finishing planer, as described for example in U.S. Pat. No. 6,447,386, incorporated therein by reference, which may accommodate even badly wrapped raw lumbers or raw lumbers having local deformations and allow feeding raw lumbers having different geometries. Both top and bottom faces of each raw lumber are surfaced simultaneously as knives positioned face to face perform a rough surfacing and then two other offset knifes do the finishing as will be discussed in relation to FIG. 4 for example, thereby allowing achieving a precise finished thickness of the surfaced lumbers.

When both top and bottom faces are thus planed and the lumber has its final thickness, the best available surface is selected in step 120 along the length of the lumber, so as to determine optimized lengths of best face on each face. For example, for a given lumber, a first length on the top face may be selected as the best face, followed by a second length on the bottom face, etc. . . .

In a complete automated step 120, the final surfaced lumbers are scanned, on at least the faces thereof, for detection of defects and grade (step 111) and all defects and grade zones are cut on an automated chop saw (step 112). Alternatively, in a semi-automated step 120, defects and grade that are manually marked by operators (step 113) are cut on an automated chop saw (step 112). Otherwise, in a manual step 120, defects and grade are manually cut out from the final-surfaced lumbers obtained in step 110 and in step 114.

In any case, boards are then positioned on their best face and best end (step 116), and transferred to the profiling unit or side matcher.

In the complete automated step 120, no human intervention is needed. In the semi-automated step 12, optimization is achieved by operators and the automated saw reads the marking done by the operators to cut our defects and grade. In the manual step 120, the whole step is performed by operators.

Since two finished faces are thus provided and the final thickness of the lumber obtained in a first step, it is possible to optimize the best available surfaces in step 120, since each lumber is already cut depending on variations of shades and coloration thereof, or according to physical defects, which allows use of maximized fine surfaces available on each face of the lumber. Each plank is thus graded even before its edges are machined in step 130.

When the best available surfaces are optimized for each lumber, the lumber is then introduced in a profiling unit (step 130). The profiling unit comprises heads for precise machining of tenons and mortises, as well as chamfers if needed. A further head provided with knives may be used to cut grooves on the face opposite the working face as will be discussed hereinbelow in reference to FIG. 5.

Therefore, the present method eliminates a step of presurfacing the lumbers by first cutting out major physical defects as is standardly done in the art, which allows reducing waste of material by preventing imprecise cutting or wrong decision by an operator, for example.

A machine according to an embodiment of another aspect of the present invention will now be described in relation to FIGS. 4 and 5.

The machine generally comprises a first unit for surfacing both faces of the lumbers (finishing planer), and a second unit (or profiling unit) for machining the edges of the lumbers, and providing grooves if needed.

Figure 4:
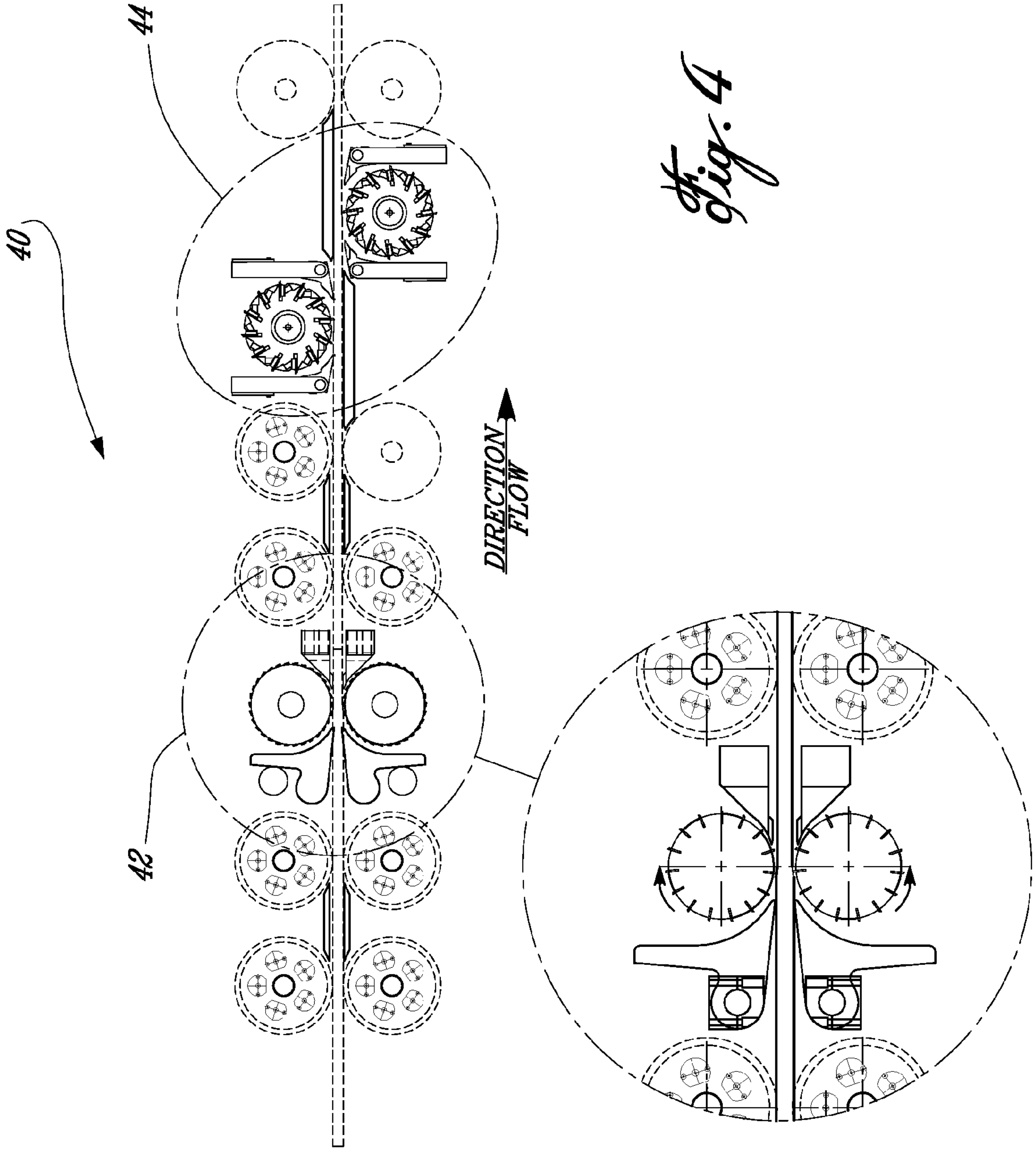
FIG. 4 illustrates a first unit of an embodiment of a machine according to a second aspect of the present invention.

FIG. 4 illustrates a first unit 40 for surfacing both faces, using, for example, a series of presser rolls 42 for pre-surfacing and a series of presser rolls 44 for finishing both sides in a single machine. Offset rollers as shown in 44 are found to achieve an efficient finishing.

Calibrating rollers preventing slippage of the lumbers, as described in U.S. Pat. No. 6,447,386, and allowing surfacing both faces of the lumber while accommodating possible bending and physical defects of the lumber, may be used. Such rollers allow eliminating jamming events due to friction of the lumbers, as discussed in U.S. Pat. No. 6,447,386, hence allowing a continuous production of planks without interruptions.

Figure 5:
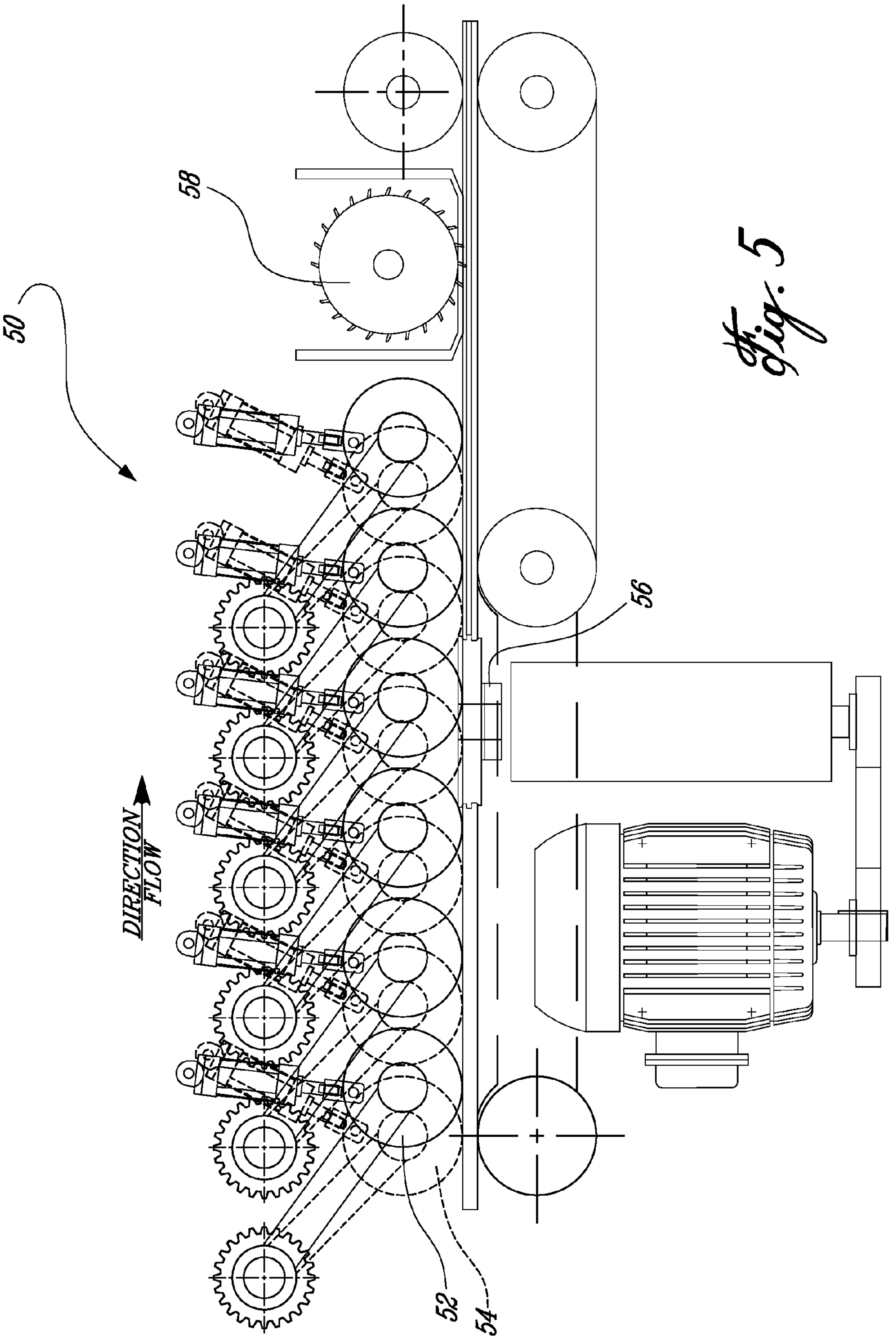
FIG. 5 illustrates a second unit of an embodiment of a machine according to the second aspect of the present invention.

FIG. 5 illustrates a second unit 50 for machining the edges of the lumbers (in step 130), including for example rolls 52, 54 for conveying the lumbers, with a head provided with knives 56 for surface finishing both edges, and a further head 58 for machining grooves. Provision of two offset rows of rolls 52, 54 as illustrated in FIG. 5 allows conforming to the curvature of each lumber as it passes therethrough, for an optimized cut. Moreover, it allows processing short lumbers, of down to 8" for example, in a through feed fashion, without needing to have them pushed through the machine by longer ones so as to prevent them from being stuck between the knives, as is currently the case in standard installations.

The second unit 50 produces lumbers provided with tenons, mortises, optionally chamfrains, and grooves on the face opposite the working face if needed. Quick adjustments are made in accordance to target widths.

Provision of two distinct units allows separation of the step of final surfacing the faces (110) from the step of machining the edges and grooves (130), and permits an increased flexibility. For example, since in a first step 110, only the faces of the lumbers are processed, the required adjustments are very quick and adjustments in case of variation of lumber widths may be achieved in less than 30 seconds, whereas similar adjustments required in currently available machines may require between 5 and 15 minutes.

At the output of the first unit, the lumbers have two finished surfaces, which allows, in a step 120, a precise assessment of coloration variations and detection of physical defects. As a result, lengths of the best one of the two finished faces are accurately selected as lengths for the working face, and cutting out of defects is done precisely, without waste of material. Each lumber may be oriented to present the wane on the edge of the tenon. The assessment may be done either by operators or by vision systems or by a combination thereof, and different levels of automation may be contemplated, as shown in FIG. 3.

As will be apparent to a person skilled in the art, the present machine and method allow a drastically simplified process, resulting in the operators being efficiently operational after a reduced time of training.

Moreover, problems of planks jamming are eliminated, and increased precision is achieved, which may even result in reducing, even eliminating, quality controls usually required at the output.

As people in the art will appreciate, such machine and method of the present application allow optimizing the yield of surfaced lumbers.

Although the present invention has been described hereinabove by way of embodiments thereof, it may be modified, without departing from the nature and teachings of the subject invention as defined in the appended claims.

The invention claimed is:

1. A method for producing wood flooring of a final thickness from raw lumbers, each raw lumber having a top raw face, a lower raw face, a first raw edge and a second raw edge, comprising, for each raw lumber:

first surfacing the top raw and lower raw faces of each raw lumber to yield intermediate lumbers having first raw edges, second raw edges, finished top and lower faces and the final thickness;

then, along a length of each intermediate lumber, selecting best faces as working faces to optimize the intermediate lumbers for cutting along their length; and then machining at least one of tenons, mortises and chamfers on the first raw edge and the second raw edges of each length of the best faces of each optimized intermediate lumber.

2. The method of claim 1, wherein said step of first surfacing the top raw and lower raw faces of each raw lumber comprises feeding the raw lumbers to a planer.

3. The method of claim 1, wherein said selecting best faces comprises the following steps:

one of: i) scanning the finished top and finished lower faces of each intermediate lumber for detection of defects and grade; and ii) manually marking defects and grade on each intermediate lumber;

cutting the defects and grade; and positioning the best faces.

4. The method of claim 1, wherein said selecting best faces comprises operators manually cutting defects and grades on each intermediate lumber; and operators positioning the best faces.

5. A system for producing wood flooring of a final thickness from raw lumbers, each raw lumber having a top raw face, a lower raw face, a first raw edge and a second raw edge, said system comprising a planer, an optimizing unit and a edge machining unit, said planer being located at an input of said system before said optimizing unit:

said planer directly receiving incoming raw lumbers, surfacing both raw top and lower raw faces of each raw lumber into planed top and lower faces, and outputting lumbers having the final thickness;

said optimizing unit receiving said lumbers having the final thickness and planed top and lower faces from said planer, said optimizing unit performing, only once, a precise assessment of coloration variations and detection of physical defects on said planed top and lower faces, and accurately selecting lengths of best faces as lengths of working faces, and cutting out defects precisely; and said edge machining unit receiving the lumbers having the final thickness with the best faces positioned by said optimizing unit, said edge machining unit machining at least one of tenons, mortises and chamfers in said edges of each length of the best faces.

6. The system of claim 5, wherein said planer comprises series of presser rolls for surfacing both raw faces of each raw lumber and obtaining the final thickness.

7. The system of claim 6, wherein said presser rolls are calibrating rollers.

8. The system of claim 5, wherein said optimizing unit comprises at least ones of: i) operators and ii) visual system.

9. The system of claim 5, wherein said edge machining unit comprises rolls for machining said edges.

10. The system of claim 9, wherein said edge machining further comprises a groove machining head.

11. The system of claim 5, wherein said planer comprises two offset rows of rolls for conveying the incoming raw lumbers.

12. The system of claim 11, wherein said edge machining unit further comprises a head for machining grooves.

13. The system of claim 5, processing incoming raw lumbers of a length down to 8".

* * * * *